United States Patent [19]

Osawa

[11] Patent Number: 4,942,488

[45] Date of Patent: Jul. 17, 1990

[54] VIDEO THEATER SYSTEM

[75] Inventor: Akihisa Osawa, Yokohama, Japan

[73] Assignee: Sony Corporation, Tokyo, Japan

[21] Appl. No.: 551,022

[22] Filed: Nov. 14, 1983

[30] Foreign Application Priority Data

Nov. 25, 1982 [JP] Japan .................. 57-206763
Nov. 26, 1982 [JP] Japan .................. 57-208345
Nov. 30, 1982 [JP] Japan .................. 57-209878

[51] Int. Cl.$^5$ .................................. G03B 31/00
[52] U.S. Cl. .......................... 360/80; 360/33.1; 360/132
[58] Field of Search ............ 360/79, 80, 33.1, 132

[56] References Cited

U.S. PATENT DOCUMENTS

| | | | |
|---|---|---|---|
| 3,643,217 | 2/1972 | Morphew et al. | 360/80 X |
| 3,859,458 | 1/1975 | Takezawa et al. | 358/147 X |
| 3,995,319 | 11/1976 | Harris | 360/132 X |
| 4,086,005 | 4/1978 | Honebrink et al. | 360/80 VR |
| 4,089,028 | 5/1978 | Wells | 360/79 |
| 4,256,955 | 3/1981 | Giraund et al. | 235/380 |
| 4,353,090 | 10/1982 | Broadbent | 358/342 |
| 4,439,670 | 3/1984 | Basset et al. | 235/382 |
| 4,463,388 | 7/1984 | Sugiyama et al. | 358/342 |
| 4,475,222 | 10/1984 | Egendorf | 360/132 X |
| 4,513,199 | 4/1985 | Sidline | 235/382.5 X |
| 4,593,337 | 6/1986 | Leone et al. | 360/132 X |

FOREIGN PATENT DOCUMENTS

| | | | |
|---|---|---|---|
| 2041622 | 9/1980 | United Kingdom . | |
| 2041622A | 8/1981 | United Kingdom . | |
| 2080597 | 2/1982 | United Kingdom | 360/80 |
| 2132812 | 7/1984 | United Kingdom . | |

OTHER PUBLICATIONS

"Zoom in Tight"; Savon; Radio Electronics; Dec. 1975, pp. 24, 66.

Primary Examiner—Aristotelis M. Psitos
Attorney, Agent, or Firm—Hill, Van Santen, Steadman & Simpson

[57] ABSTRACT

In a video theater system, a video projector and a cassette video player are employed for playing a movie. The cassette video player employed in this system uses a video cassette which has various control signals together with a movie program on a video tape. These control signals are recorded at vertical blanking intervals and manage automatic system operation of the video theater.

8 Claims, 6 Drawing Sheets

VIDEO THEATER SYSTEM

BACKGROUND OF THE INVENTION

The present invention generally relates to a video theater system employing a video cassette player and a video projector, and more particularly relates to a video theater system which can be automatically controlled in accordance with control codes recorded on a video tape.

Recently, a video theater using a video projector and a video cassette player has become very popular. This video theater uses a relatively simple apparatus and is therefore suitable for a small movie theater.

Video theaters of this type, however, require man power which is the same as that of a large movie theater in order to control a blackout curtain, screen size, and so on. Furthermore, since the playback time of the video cassette is one hour, the video cassette must be exchanged to play the movie having a playing time of longer than one hour.

SUMMARY OF THE INVENTION

Accordingly, it is an object of the present invention to provide a novel video theater system.

It is another object of the present invention to provide a video theater system employing a video cassette player and a video projector.

It is further an object of the present invention to provide a novel video theater system which can automatically control the theater appliances in accordance with a control signal recorded on a video cassette tape.

According to one aspect of the present invention, a control code used in the video theater system according to the present invention is inserted into the vertical blanking interval of a video signal. The control signal is read out during a playback mode to automatically control the projection size, screen size, lighting conditions, and so on. On the other hand, a control signal is also used to control the sequence play of a pair of video tape recorders (VTRs). Since the maximum play time of the video cassette is one hour, when a video program having a playing time over one hour long is played, the sequence play operation of two VTRs must be carried out. The control code for controlling this sequence play operation is also recorded on the video tape.

The other objects, features and advantages of the present invention will become apparent from the following description taken in conjunction with the accompanying drawings through which the like references designate the same elements and parts.

DESCRIPTION OF THE PREFERRED EMBODIMENT

Now, the present invention will hereinafter be described with reference to the attached drawings.

Figure 1:
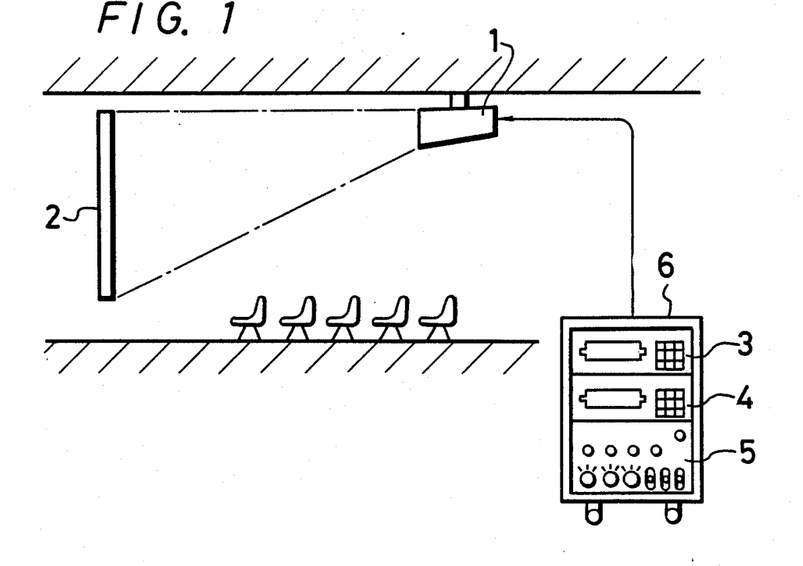
FIG. 1 is a schematic diagram showing an example of a video theater system according to the present invention.

FIG. 1 is a schematic diagram showing an outline of a video theater system of the present invention.

As shown in FIG. 1, a video theater system requires a video projector 1 hung down from a ceiling of a room, and a projector-screen 2 is provided in facing relation to the projector 1. Furthermore, a pair of cassette VTRs 3 and 4 are prepared for supplying video signals to the video projector 1. The operation of these VTRs 3 and 4 is controlled by a controller 5. The VTRs 3, 4 and the controller 5 are housed in a console 6.

In general, in a U-matic (trade mark) cassette VTR employing a video tape of, for example, ¾-inch width, the maximum playing time thereof is one hour, for example. Therefore, when a video program having a playing time longer than one hour is projected, the playing of the video program can not be carried out continuously by one cassette VTR. For this reason, as shown in FIG. 1, two cassette VTRs 3 and 4 are prepared, and thus a playing time longer than one hour can be realized by sequence play of two cassette VTRs 3 and 4. Of course, a playing time of more than two hours can be carried out by driving two cassette VTRs 3 and 4 successively and alternately. If necessary, more than two VTRs may be provided.

Figure 2A:
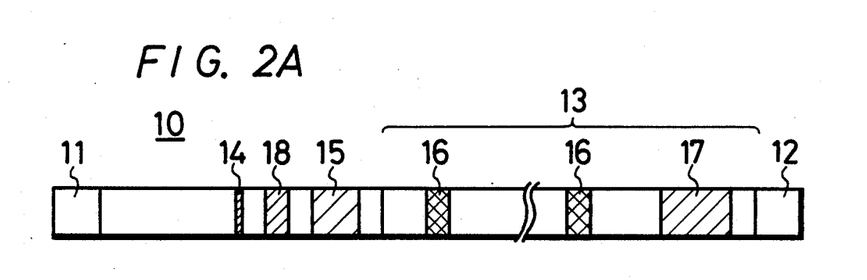
FIGS. 2A and 2B are diagrams showing a tape pattern on the video tape used in the present invention.
Figure 2B:
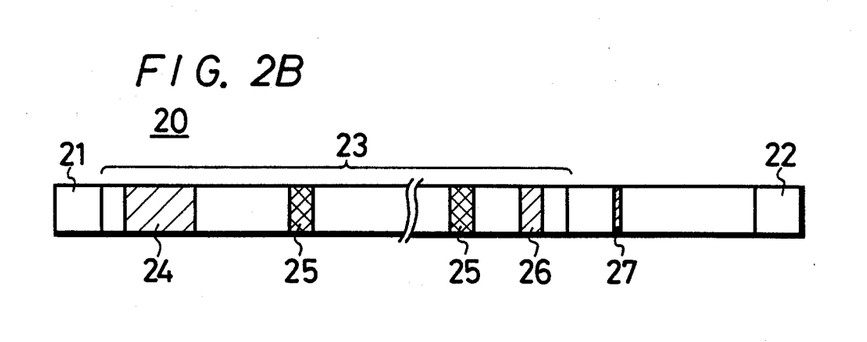

In the video theater system, various measures are taken to conserve manpower. FIGS. 2A and 2B show various signals which are recorded on the video tape for this purpose. FIG. 2A shows a tape pattern 10 formed on a video tape of a cassette which is installed on the VTR 3, while FIG. 2B shows a tape pattern 20 formed on a video tape of a cassette which is installed on the VTR 4. As shown, the respective video tapes are provided at both ends thereof with white leader tapes 11, 12 and 21, 22. Considering a video program having a playing time of, for example, two hours, the first half of the video program is recorded in a region or area 13 of the tape pattern 10, while the second half of the video program is recorded in an area 23 of the tape pattern 20.

On the tape pattern 10, there are respectively recorded a stop code 14, a start command code 15, a theater ID code 16, and a sequence play control code 17. On the other hand, on the tape pattern 20, there are recorded a sequence play control code 24, a theater ID code 25, an end command code 26, and an end code 27, respectively. In an area 18 of the tape pattern 10, there is recorded the number of play backs of the tape. That is, the above number of playbacks is incremented by one each time when the video cassette is used and then re-recorded.

Figure 3:
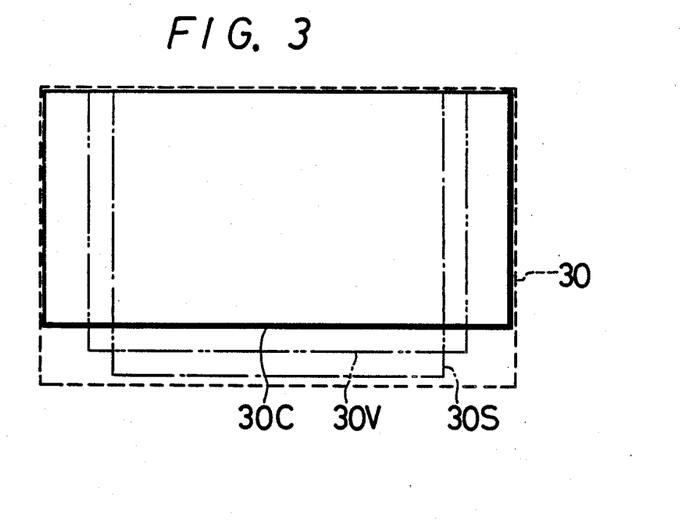
FIG. 3 is a diagram showing an example of a projection size of a video projector used in the video theater system of the present invention.

The start command code 15 includes various types of information to automatically play back the video program. For example, this command code 15 may include such information signals as follows: a projection size command signal which controls a deflection system of a video projector in such a manner that the size of the projection image 30 of the video projector shown by a broken line in FIG. 3 is changed into one of standard size shown by a one-dot broken line 30S, vista vision size shown by a two-dot broken line 30V, and Cinemascope (trade mark) size shown by a solid line 30C depending on the video program recorded on the video tape. For example, a screen size command signal may be provided which automatically sets the screen size in the movie theater by moving the black-curtain depending on the size of the movie such as standard, vista vision, and Cinemascope recorded on the video tape. A color control command signal may be provided which sets the reference color relative to the relation of the color signals from the video projector (by, for example, skin color reference signal). An audio control command signal may be provided which selectively changes the audio system depending on whether the audio signal recorded on the tape is a monaural or stereophonic signal. A sequence control command signal may be provided which sets the sequence play of the VTRs for the movie recorded on the video tape.

These code signals are superimposed at predetermined horizontal scanning intervals in the vertical blanking period. The circuits for these code signals are used in common as will be described later. For example, these code signals are recorded at the 12th horizontal scanning interval counted from the V-sync (vertical synchronizing signal). For example, 16 bits are recorded at one horizontal scanning interval so that the code signals are recorded over several fields, if necessary.

Figure 4A:
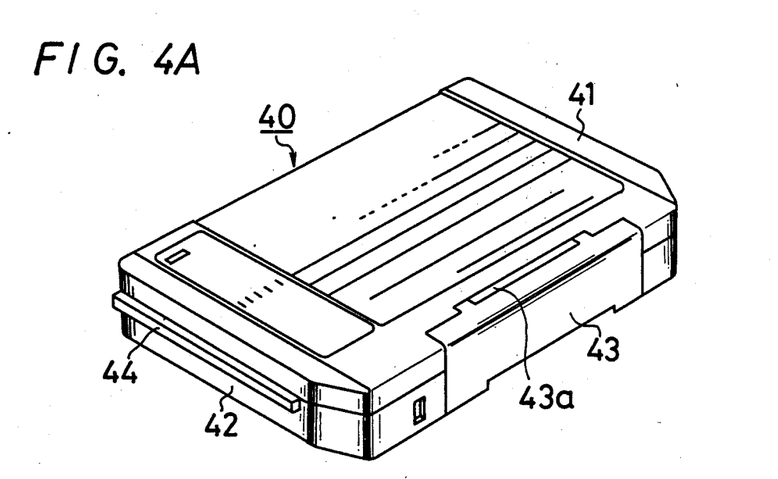
FIG. 4A is a perspective view showing an example of a video cassette which is designed for video theater use.
Figure 4B:
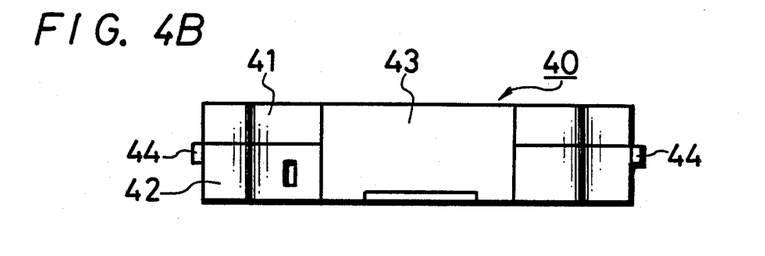
FIG. 4B is a front view thereof.
Figure 5:
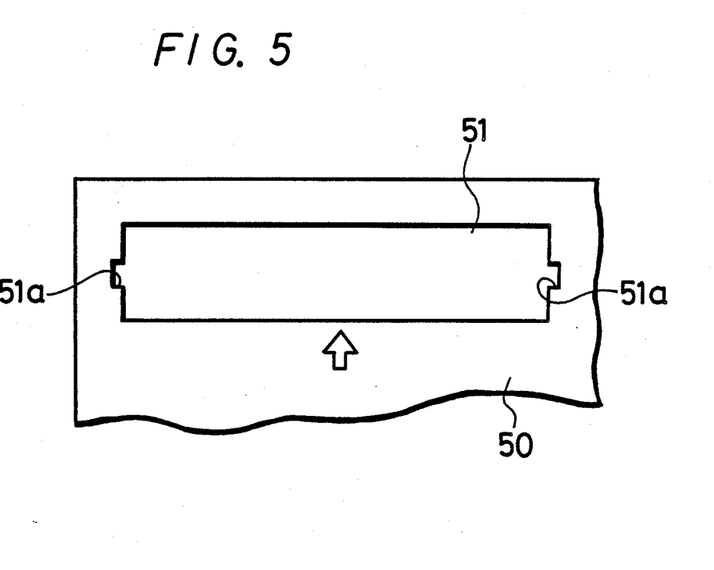
FIG. 5 is a front view of a VTR used in the video theater system of the present invention.

Considering the video theater system, each theater rents the VTR console 6 in which the VTRs 3, 4 and the controller 5 are incorporated together. Of course, a program creator also rents a video program to each video theater in the form of a video cassette. In this case, various techniques are provided to inhibit unfair personal use of the video cassette delivered for video theater use. One such technique is that the shape of the video cassette for video theater use is designed differently than the shape of a conventional video cassette. An example of a video cassette for video theater use is shown in FIGS. 4A and 4B. Reference numeral 40 designates such a video cassette which comprises an upper half 41, a lower half 42, and a lid 43. The upper half 41 and the lower half 42 are each formed by plastic molding, and the lid 43 is made of metal and hinged at 43a to the upper half 41. The configuration of this video cassette mentioned above is the conventional U-matic video cassette having incorporated therein a supply-reel and a take-up reel around which a video tape is wound. The feature of the video cassette for video theater use lies in a rib 44 provided at both side walls of the video cassette 40. Accordingly, the conventional U-matic VTR can not accept this video cassette for video theater use because of the ribs 44. However, each of the VTRs 3 and 4 for video theater use includes a cassette entrance with the shape as shown in FIG. 5. Namely, a cassette opening 51 bored through a front panel 50 includes cut outs 51a corresponding to the ribs 44 formed at both side walls of the cassette 40. Thus, the video cassette 40 for video theater use can be played by only the VTR for video theater use, but the video cassette 40 cannot be played by the ordinary VTR, and hence dubbing is inhibited.

Furthermore, in order to avoid unfair dubbing of the video cassette tape delivered to the video theater, an ID signal is recorded thereon together with the video program. More particularly, when a video program is recorded on a video cassette for rental use from a master VTR, the theater ID code assigned to each video theater is recorded on the video tape and mixed with the video program.

Figure 6A:
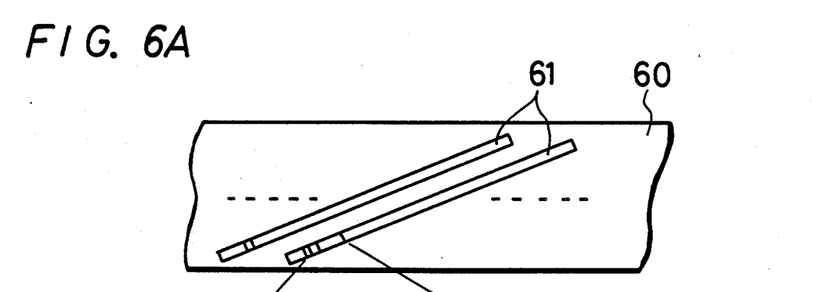
FIG. 6A is a diagram showing a track pattern on the video tape used in the present invention.
Figure 6B:
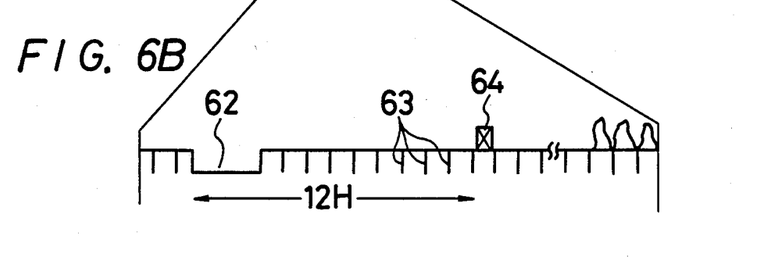
FIG. 6B is an enlarged view of the video track on the video tape used to explain an ID code signal recorded on the video track shown in FIG. 6A.

As shown in FIG. 6A, a plurality of video tracks 61 are recorded in slantwise fashion on a video tape 60. For example, an ID code 64 is inserted into the 12th horizontal scanning interval counted from the V-sync signal 62 of a video signal (see FIG. 6B). The ID code 64 is recorded at the 12th horizontal scanning interval of the video tape in the form of digital data so that a general user can not erase this ID code 64 alone without difficulty. In FIG. 6B, reference numeral 63 designates the horizontal synchronizing signals.

Figure 7:
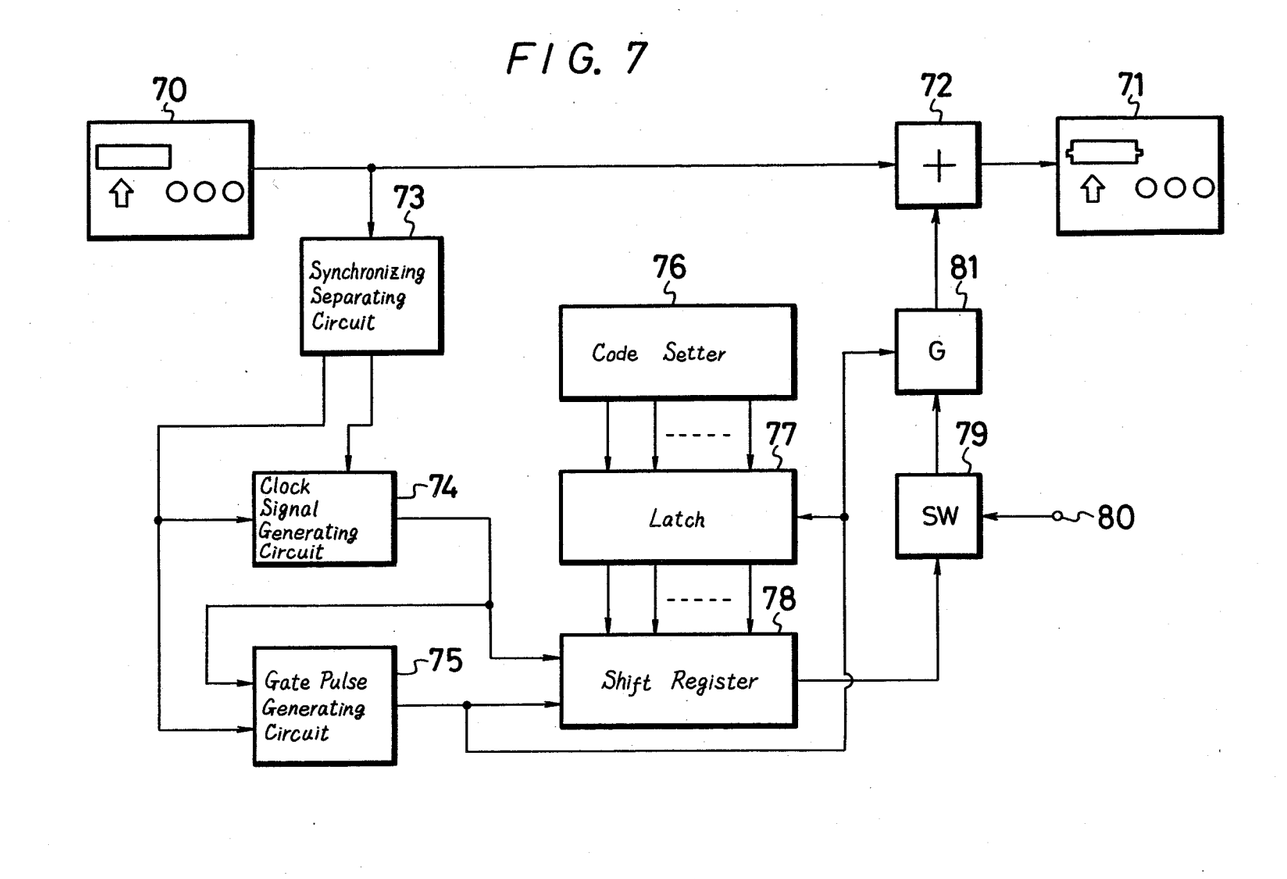
FIG. 7 is a block diagram of a code signal mixing circuit used in the present invention.

When the recorded video cassette tape for video theater use is made by superimposing this ID code 64 at horizontal scanning intervals of the video signals, a code signal mixing circuit shown in FIG. 7 is employed.

The code signal mixing circuit shown in FIG. 7 is used to record not only the theater ID code but also all the code signals mentioned before. Namely, this code signal mixing circuit is used to copy the video program recorded on the master video tape onto a video tape of a rental video cassette.

The code signal mixing circuit shown in FIG. 7 will be described with reference to a case in which the theater ID code is recorded. As previously shown in FIGS. 2A and 2B, the theater ID code is superimposed at the predetermined portions or areas 16 and 25 in the video programs 13 and 23 and then recorded.

In FIG. 7, reference numeral 70 designates a master VTR for reproducing a master video tape on which a desired program was recorded and 71 a slave VTR for copying a video tape which will be delivered to each video theater. The reproduced video signal from this master VTR 70 is supplied through a mixing circuit 72 to the recorded signal input terminal of the slave VTR 71. The video signal reproduced from the master VTR 70, is also supplied to a synchronizing separating circuit 73. The horizontal synchronizing signal appearing at the output side of the synchronizing separating circuit 73 is supplied to a clock signal generating circuit 74. The clock signal generating circuit 74 is synchronized with this synchronizing signal. The horizontal and vertical synchronizing signals obtained at the output side of the synchronizing separating circuit 73 are supplied to a gate pulse generating circuit 75. Reference numeral 76 designates a code setter which sets a particular ID code being assigned to each video theater to which the video tape is delivered. The ID code signal set by this code setter 76 on the basis of a BCD (binary coded decimal) coding method is supplied to a latch 77. The latch 77 is triggered at the leading edge of the gate signal from the gate pulse generating circuit 75. The output signal from the latch 77 is supplied to a 16 bit shift register 78 in which parallel data is converted to serial data. The ID code signal according to the BCD coding method obtained at the output side of the shift register 78 is fed to the mixing circuit 74 through a switching circuit 79 which is turned on and off in response to the control signal being supplied to a control signal input terminal 80 from the outside and a gate circuit 81 which allows the passage of a signal therethrough during a particular horizontal scanning interval. In this case, when the ID code signal for a particular theater is recorded on the whole area of the video tape, a control signal which allows the switching circuit 79 to be always on is supplied to the control signal input terminal 80. However, the following version may be possible that a control signal which will turn on this switching circuit 79 at each predetermined time for a predetermined duration of time or a control signal which will turn on the switching circuit 79 in the main portion of the recorded contents of the master video tape is supplied to the control signal input terminal 80.

When the video tape according to this embodiment is obtained, namely, the video tape to be delivered to the video theater is obtained by copying the master video tape which will be supplied to the video projector, it is obtained in the following manner. First, the ID code specified for each video theater to which the video cassette is delivered is set by the code setter 76. The ID code signal thus set by the code setter 76 is supplied through the latch 77 to the shift register 78. At that time, the master VTR 70 is placed in the playback mode. As a result, the video signal played back from this master VTR 70 is supplied to one input terminal of the mixing circuit 72, the gate signal from the gate pulse generating circuit 75 is supplied to the gate circuit 81 and during the period of this gate signal, the ID code signal is supplied to the other input terminal of the mixing circuit 72. Thus, at the output side of this mixing circuit 72 appears a video signal in which the ID code signal is superimposed on the 12th horizontal scanning interval counted from the V-sync signal. This video signal is recorded on the video tape by the slave VTR 71. Therefore, the video tape to be delivered to the video theater is recorded with the ID code signal for the video theater superimposed upon the vertical blanking interval of the video signal.

The video tape thus created is delivered to the video theater of which the ID code is coincident with the predetermined ID code. In the video theater employing the delivered video tape, a predetermined video program can be projected by the video projector. In this case, since the ID code signal is superimposed upon the vertical blanking interval of the video signal, no bad influence is exerted on the picture on the screen.

When the unfair copying of the delivered video tape is made, the head office for delivering the video tape to each video theater prepares an ID code reader to detect the ID code signal superimposed upon the vertical blanking interval of the video signal of the copied video tape, so that it is possible to determine a particular video theater which performed the unfair copying of the video tape by detecting the ID code superimposed on the copied video tape.

Similarly, the command codes, etc. as mentioned before can be recorded by setting various codes by the code setter 76. These various codes are recorded at the positions shown in FIGS. 2A and 2B.

The codes being recorded to manage the automatic operation include the stop code 14, the start command code 15, the sequence play control codes 17 and 24, the end command code 26 and the end code 27. The start command code 17 can include a lighting control signal besides the control signals mentioned before. In like manner, the end command code 26 can include the lighting control signal to automatically control the lighting condition of the video theater. Moreover, the end command code 26 can include a black curtain control signal by which, after the end of playing, the black curtain can be closed automatically. The video cassette in which these codes are recorded together with the video program is rented by each video theater.

The VTR console 6 installed for each video theater includes the controller 5 which incorporates therein a code reader and a circuit for performing automatic control. For example, the code reader has the circuitry as shown in FIG. 8 and is provided for each VTR.

Figure 8:
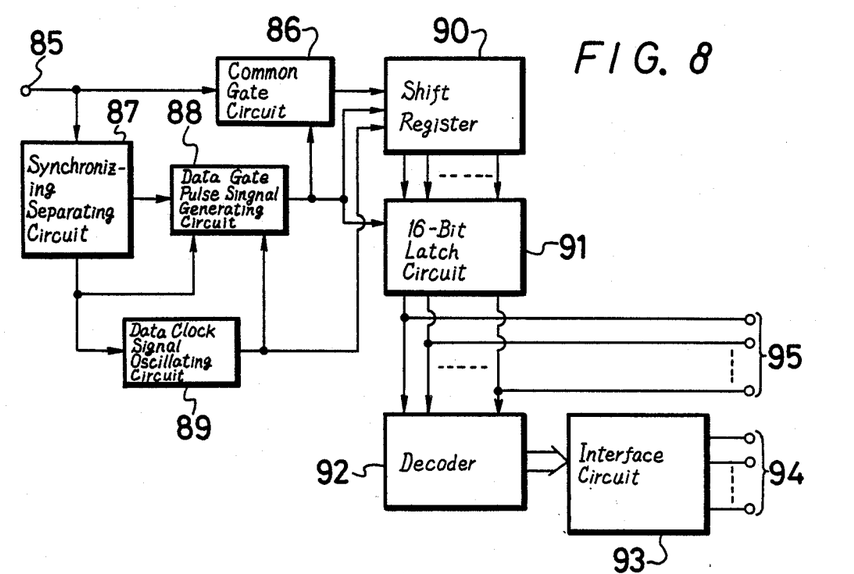
FIG. 8 is a block diagram of a code reader employed by the VTR in the present invention.

In FIG. 8, reference numeral 85 designates an input terminal to which the video signal played back by the VTR is supplied. The video signal from this input terminal 85 is supplied to a command gate circuit 86 and also to a synchronizing separating circuit 87. The vertical and horizontal synchronizing signals delivered from the synchronizing separating circuit 87 are supplied to a data gate pulse signal generating circuit 88 which then generates a data gate pulse signal synchronized with the vertical synchronizing signal. The data gate pulse signal appearing at the output side of the data gate pulse signal generating circuit 88 is supplied to the command gate circuit 86 as its gate signal.

On the other hand, the horizontal synchronizing signal delivered from the synchronizing separating circuit 87 is supplied to a data clock signal oscillating circuit 89 as the synchronizing signal so as to allow the data clock signal oscillating circuit 89 to be oscillated in synchronism with the horizontal synchronizing signal. The output signal from the command gate circuit 86 is supplied to, for example, a 16-bit shift register 90 which then reads the same in response to the data clock signal from the data clock signal oscillating circuit 89. The output signal from this shift register 90 is supplied to a 16-bit latch circuit 91 when the data gate pulse signal occurs from the data gate pulse signal generating circuit 88. The output signal from the 16-bit latch circuit 91 is supplied to a decoder 92 in which respective command signals are reproduced. The output signal from this decoder 92 is supplied to an interface circuit 93 and a system control apparatus (not shown) is operated by this interface circuit 93. For example, when the recorded video program is a Cinemascope size, in accordance with the start command code 15, the deflection system of the video projector is controlled by the screen-size command signal to allow the projection screen of the video projector to become such as shown by the solid line 30C in FIG. 3. Furthermore, in response to the screen size command signal the black curtain is moved to provide a Cinemascope screen size, and the audio system is put into, for example, a stereophonic mode in response to the audio command signal. The system then plays the Cinemascope movie. Such control signals for automatic control use appear at an output terminal 94 of the interface circuit 93, while the output of the latch 91 is delivered to an output terminal 95.

Figure 9:
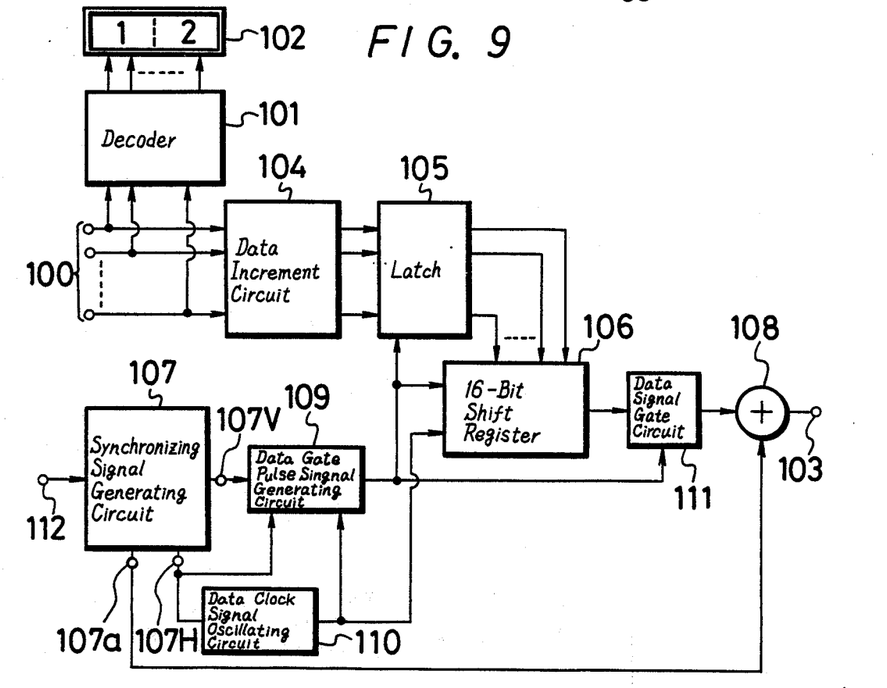
FIG. 9 is a block diagram of a circuit which increments the number of playbacks of the video cassette at each playback thereof used in the present invention.

The data from the terminal 95 is used to record the number of playbacks and to carry out the sequence play control. For example, as described before, the program cassette is for rental use and the rental fee thereof is determined by the number of playbacks. Therefore, a program supplier needs to determine the number of playbacks in the video theater. For this purpose, an apparatus for automatically rewriting the number of playbacks is incorporated into the controller 5. The number of playbacks is recorded on the area 18 of the tape pattern 10 (see FIG. 2A). When the number of playbacks is incremented by rewriting at each playback, a circuit shown in FIG. 9 is employed.

When a video cassette is installed on the VTR 3, its video tape is usually stopped at the position of the start code 14 shown in FIG. 2A. When the start button is depressed upon starting of the playback of the video tape, first the VTR 3 plays back the value corresponding to the number of playbacks recorded at the area 18 in the tape pattern 20 shown in FIG. 2B. The above playback circuit practically employs the circuit shown in FIG. 8, and the data thus obtained is supplied through the output terminal 95 to an input terminal 100 of the circuit shown in FIG. 9. The data applied to the input terminal 100 is supplied through a decoder 101 to a display apparatus 102 which then displays the number of playbacks of this video tape up to the present time recorded on the data record area 18.

When the reading of the number of playbacks from the data record area 18 ends, the VTR 3 is again set to the rewind mode and the video tape thereof is rewound to its predetermined position, for example the position of the start code 14. After that, the VTR 3 is set to the recording mode to record on the data record area 18 of the video tape a signal obtained at a record signal output terminal 103. More particularly, the data applied to the input terminal 100 is supplied to a data increment circuit 104 which increments the data by a digital signal corresponding to "1" in decimal rotation. The data incremented by the data increment circuit 104 is supplied through a latch 105 to a 16-bit shift register 106. In FIG. 9, reference numeral 107 designates a synchronizing signal generating circuit which generates the vertical and horizontal synchronizing signals of a video signal. The composite synchronizing signal obtained at a composite synchronizing signal output terminal 107a of the synchronizing signal generating circuit 107 is supplied to one input terminal of an adding circuit 108. Moreover, the vertical synchronizing signal obtained at a vertical synchronizing signal output terminal 107V and the horizontal synchronizing signal obtained at a horizontal synchronizing signal output terminal 107H of the synchronizing signal generating circuit 107 are respectively supplied to a data gate pulse signal generating circuit 109 which then generates a data gate pulse signal having a predetermined horizontal scanning interval in the vertical blanking period synchronized with the vertical synchronizing signal. In response to this data gate pulse signal, the data signal is supplied to the 16-bit shift register 106. On the other hand, the horizontal synchronizing signal appearing at the horizontal synchronizing signal output terminal 107H of this horizontal synchronizing signal generating circuit 107 is supplied to a data clock signal oscillating circuit 110 as the synchronizing signal thereof. As a result, this data clock signal oscillating circuit 110 is oscillated in synchronism with the horizontal synchronizing signal. If necessary, the synchronizing signal generating circuit 107 is operated in synchronism with an external signal applied to a terminal 112. The output signal from the 16-bit shift register 106 is converted in the parallel to serial form. The serial signal therefrom is supplied through a data signal gate circuit 111 to the other input terminal of the adding circuit 108. In this case, the data signal gate circuit 111 is controlled in response to the data gate pulse signal from the data gate pulse signal generating circuit 109.

During the period of the data gate pulse signal in the vertical blanking interval of the video signal obtained at the output side of the adding circuit 108, a signal incremented by a digital signal "+1" relative to the number of the playbacks at the present time appears at the record signal output terminal 103 and this signal is recorded at the data record area 18 of the video tape. After the recording of the number of playbacks is ended, the VTR 3 is released from its recording mode and then placed into the playback mode to play back the video program signal. After that, this video program signal is projected by the video projector.

Accordingly, when the delivered video tape is collected and the number of the playbacks recorded on the data record area 18 is detected, it is possible to figure out whether the number of playbacks is coincident with the contracted one or not. If the detected number exceeds the contracted number, the existence of the unfair use, copying, and so on can be checked.

As described before, the VTR employed as the video signal source for the video projector used in this video theater system employs the video cassette having the video tape on which the desired program was recorded. As this video cassette, a video cassette having a one-hour playing time is generally used to play the movie with excellent picture quality. Therefore, when a movie having a playing time longer than one hour is played, it is necessary for a plurality of VTRs, for example two VTRs, to be driven for the sequence play and to change them without disturbing the picture on the screen. When the sequence play of a plurality of VTRs is carried out, it is necessary to change them without disturbing the picture on the screen by use of a system having a simple construction. In other words, a reproduced signal of the address signal 17 recorded at the end of the first video tape reproduced by the first VTR 3 and a reproduced signal of the address signal 24 recorded at the beginning of the second video tape reproduced by the second VTR 4 are compared with each other. Then, in response to the compared difference signal therefrom, the running speed of the second video tape reproduced by the second VTR 4 is controlled. When the reproduced signals of the address signals by the first and second VTRs 3 and 4 become coincident with each other in stable fashion, the reproduced output signal from the second VTR 4 is used. According to the present invention, the sequence play of the first and second VTRs 3 and 4 is carried out and they are changed without disturbing the picture on the screen.

Figure 10:
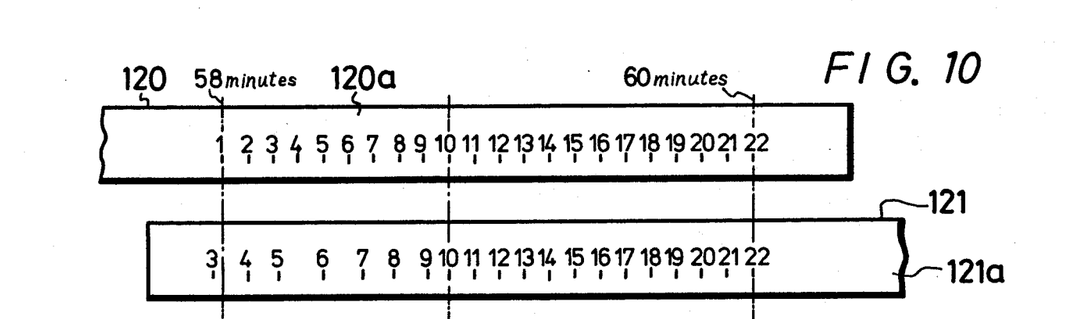
FIG. 10 is a diagram used to explain address signals recorded on the video tape in the present invention.

As shown in FIG. 10, for example, the address signals are sequentially recorded in advance by the BCD code at the predetermined positions in the vertical blanking period of the video signal in an end area 120a, for a duration of two minutes, for example, at the time interval 58 to 60 minutes on the first video tape 120. The video signals (including the address signals) which are the same as those recorded in the end area 120a of the video tape 120 during the interval of two minutes, for example, are recorded at the start area 121a during an interval of two minutes of the second video tape 121 which will be played back in succession the next time. During an interval of, for example, two minutes, the video signals are recorded in superimposed fashion on the first and second video tapes 120 and 121. After that, the video signals of the program for sequence play are recorded on the second video tape 121. When the playing time exceeds two hours, the video signals are similarly recorded between second and third video tapes.

The address signals which are shown in FIG. 10 correspond to the sequence play control codes 17 and 24 shown in FIGS. 2A and 2B. These address signals are recorded by the use of the circuit shown in FIG. 7.

In the present embodiment, the play sequence from the first video tape 120 to the second video tape 121 will now be described. In the video theater, first the first video tape 120 is played back by the first VTR 3, and at that time, the video cassette in which the second video tape 121 is installed is inserted into the cassette entrance of the second VTR 4 and then placed in the playback standby mode. When, for example, the timer in the first VTR 3 indicates that the played back time reaches 58 minutes, the second VTR starts its playback.

Figure 11:
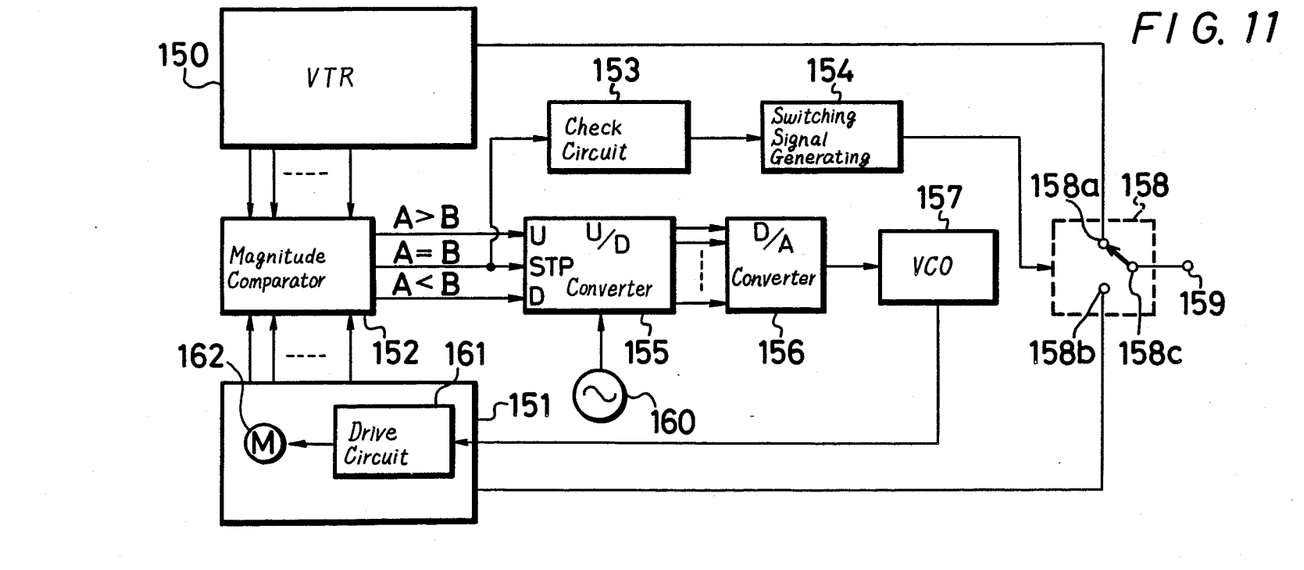
FIG. 11 is a block diagram showing a control circuit necessary for automatic sequence playback in the present invention.

FIG. 11 shows a control circuit necessary for automatic sequence playback. In this figure, reference numeral 150 designates a first VTR, while reference numeral 151 designates a second VTR. In each of the first and second VTRs 150 and 151, the sequence play control codes, namely, the address codes, are played back by the code reader incorporated therein. These reproduced address codes are respectively supplied to a magnitude comparator 152. The output signal from the magnitude comparator 152 is supplied to an U/D (up-down counter) 155 under one of three conditions that the output signal A is larger than the output signal B, A>B, the output signal A is equal to the output signal B, A=B and the output signal A is smaller than the output signal B, A<B. The output from the U/D counter 155 is supplied to a D/A (digital-to-analog) converter 156. Reference numeral 157 designates a voltage controlled oscillator (VCO) of which the control voltage is controlled in response to a difference between the address signal A of the video tape 120 in the first VTR 150 and the address signal B of the video tape 121 in the second VTR 151 appearing at the output side of the D/A converter 156. The output signal from the VCO 157 is supplied to a drive circuit 161 in the second VTR 151 to which the external synchronization can be applied. The output signal from this drive circuit 161 is supplied to drive a motor 162 which determines the running speed of the video tape 121 in the second VTR 151. The motor 162 in the second VTR 151 is controlled in such manner that the address signal B played back by the second VTR 151 may coincide with the address signal A played back by the first VTR 150. The output signal provided by the magnitude comparator 152 when the address signal A equals the address signal B is supplied to a check circuit 153 which checks whether the condition of the address signal A equal to the address signal B (A=B) lasts, for example, for 5 seconds. When the condition of A=B lasts for 5 seconds, the output of the check circuit 153 is supplied to a switching signal generating circuit 154 as its control signal. Thus, the switching signal generating circuit 154 produces at its output side the switching signal. The switching signal from the switching signal generating circuit 154 is supplied to a change-over circuit 158 such that its movable contact 158c is changed in position from its first fixed contact 158a to its second fixed contact 158b in response to the switching signal. The first fixed contact 158a of the change-over circuit 158a is supplied with the reproduced video signal from the first VTR 150, while the second fixed contact 158b is supplied with the reproduced video signal from the second VTR 151. The movable contact 158a is connected to a video signal output terminal 159 from which the video signal is supplied to the video projector.

With the construction as mentioned above, at first the video signal reproduced from the first VTR 150 is supplied through the first fixed contact 158a of the change-over circuit 158, its movable contact 158c, and the output terminal 159 to the video projector. When the timer in the first VTR 150 reaches 58 minutes, the second VTR 151 is also placed in the playback mode. At that time, the code reader shown in FIG. 8 extracts the address signals A and B recorded in the vertical blanking periods from the first and second VTRs 150 and 151. The address signals A and B are compared with each other in the magnitude comparator 152. When there is a difference between the address signals A and B, the revolution speed of the motor 162 which determines the transport speed of the video tape 121 in the second VTR 151 is controlled so as to make the address signals A and B equal to each other. When the address signals A and B become equal to each other in a stable manner, for example the condition of A=B lasts for 5 seconds, the switching signal generating circuit 154 generates the switching signal. In response to the switching signal, the movable contact 158c of the change-over circuit 158 is changed in position to its second fixed contact 158b so that the video signal reproduced from the second VTR 151 is supplied through the change-over circuit 158a to the video projector and the sequence play of the VTRs 150 and 151 can be accomplished. In this case, when the reproduced signal of the address signal A recorded in the vertical blanking interval of the video tape 120 in the first VTR 150 becomes equal in a stable manner to the reproduced signal of the address signal B recorded in the vertical blanking interval of the video tape 121 of the second VTR 151, the change-over circuit 158 is switched to allow the video signal reproduced from the second video tape 121 to be used. Thus, upon this switching, the reproduced picture on the screen is never disturbed.

In the above embodiment, when the address signals A and B are not equal in stable fashion to each other after a predetermined time elapses, for example the first video tape 120 reaches 59 minutes and 40 seconds, it is possible that the movable contact 158c of the change-over circuit 158 is forcibly switched. And when no address signal exists in the first VTR 150, it is automatically placed in the rewind mode.

Although various minor changes and modifications might be proposed by those skilled in the art, it will be understood that I wish to include within the claims of the patent warranted hereon all such changes and modifications as reasonably come within my contribution to the art.

I claim as my invention:

1. A video theater system, comprising: a video projector; a projector-screen; a video cassette player; a video cassette containing a video tape for playback in the cassette player; a theater controller means for controlling operation of the theater system; and said video tape having a video program and recorded information codes recorded on a plurality of slant tracks in the video, said controller means including information code reader means for generating code signals based on said recorded information codes recorded on said video tracks, wherein said code signals recorded on slant tracks include command signals to be supplied to said video projector useful in controlling a projection size thereof.

2. A video theater system, comprising: a video projector; a projector-screen; a video cassette player; a video cassette containing a video tape for playback in the cassette player; a theater controller means for controlling operation of the theater system; and said video tape having a video program and recorded information codes recorded on a plurality of slant tracks in the video, said controller means including a information code reader means for generating code signals based on said recorded information codes recorded on said video tracks, wherein said code signals recorded on slant tracks include command signals which indicate the screen size of the theater.

3. A video theater system, comprising a video projector; a projector-screen; a video cassette player; a video cassette containing a video tape for playback in the cassette player; a theater controller means for controlling operation of the theater system; and said video tape having a video program and recorded information codes recorded on a plurality of slant tracks in the video, said controller means including information code reader means for generating code signals on said recorded information codes recorded on said video tracks, wherein said code signals recorded on slant tracks include a code corresponding to a number of playbacks of said video cassette.

4. A video theater system according to claim 3 wherein said controller means further includes a code recording circuit means for recording and for reading the number of prior playbacks from said video tracks of said vide cassette and means for erasing said number and means for recording said number plus one value on said video tape.

5. A video theater system, comprising: a video projector; a projector-screen; first and second video cassette players; first and second video cassettes containing common program material, the first and second cassette being insertable in the respective first and second cassette players; said first and second cassettes having respective first and second video tapes, each video tape having slant video tracks upon which is recorded video and a portion of the common program material along with recorded information codes interspersed at various points on the video tape in said slant video tracks, said information codes including a sequence control code used in sequencing the play of the first and second cassette players when an end of the first video tape is reached and a beginning of the second video tape is to be played in precise sequence with the end of the first video tape; and controller means for responding to the recorded information codes recorded on said slant video tracks to provide at least sequence control, wherein the information codes recorded on slant tracks further include a code corresponding to a number of playbacks of said video tape of at least one of the cassettes.

6. A method for operating a video theater having a video projector, a projector-screen, and at least one video cassette player for playing a rented video cassette containing a video tape with a program thereon recorded on slant tracks in said video comprising the steps of: providing the video tape having the video program thereon with recorded information codes on the video slant tracks; providing a controller means for decoding the information codes from the video tape; and controlling theater system operations by use of said information codes, including the step of reading the recorded information codes on said slant tracks to obtain the number of times the video tape has been played.

7. A method according to claim 6 including the step of reading the information codes on said slant tracks and controlling the size of the screen.

8. A method according to claim 6 wherein at least two video cassette players are provided and the recorded information codes on said slant tracks are read to control the play of a first video tape to its end in a first of the cassette players and to control the start of a second video tape in a second of the cassette players.

* * * * *